United States Patent
Sepúlveda Chavera et al.

(10) Patent No.: US 12,478,070 B2
(45) Date of Patent: Nov. 25, 2025

(54) **BIOFUNGICIDE BASED ON THE BACTERIUM *PSEUDOMONAS LINI* STRAIN S57 AND METHOD OF USE FOR THE CONTROL OF PHYTOPATHOGENIC FUNGI**

(71) Applicants: FUNDACIÓN UC DAVIS—CHILE LIFE SCIENCES INNOVATION CENTER, Santiago (CL); UNIVERSIDAD DE TARAPACÁ, Arica (CL)

(72) Inventors: Germán Sepúlveda Chavera, Arica (CL); Patricio Muñoz Torres, Santiago (CL)

(73) Assignees: FUNDACION UC DAVIS—CHILE LIFE SCIENCES INNOVATION CENTER, Santiago (CL); UNIVERSIDAD DE TARAPACÁ, Arica (CL)

( * ) Notice: Subject to any disclaimer, the term of this patent is extended or adjusted under 35 U.S.C. 154(b) by 570 days.

(21) Appl. No.: 17/760,409

(22) PCT Filed: Feb. 2, 2021

(86) PCT No.: PCT/CL2021/050008
§ 371 (c)(1),
(2) Date: Aug. 9, 2022

(87) PCT Pub. No.: WO2021/159221
PCT Pub. Date: Aug. 19, 2021

(65) Prior Publication Data
US 2023/0082034 A1 Mar. 16, 2023

(30) Foreign Application Priority Data
Feb. 10, 2020 (CL) .................... 0348-2020

(51) Int. Cl.
*A01N 63/27* (2020.01)
*A01P 3/00* (2006.01)

(52) U.S. Cl.
CPC ............... *A01N 63/27* (2020.01); *A01P 3/00* (2021.08)

(58) Field of Classification Search
None
See application file for complete search history.

(56) References Cited

FOREIGN PATENT DOCUMENTS

WO 2012040343 A2 3/2012

OTHER PUBLICATIONS

Munoz Torres et al. The Endophytic *Pseudomonas* sp. S57 for Plant-Growth Promotion and the Biocontrol of Phytopathogenic Fungi and Nematodes, Plants (Jul. 27, 2021), 10(8), 1531). (Year: 2021).*
International Search Report issued for International Patent Application No. PCT/CL2021/050008, Date of mailing: May 4, 2021, 7 pages including English translation.
Kang, B. R., "Biocontrol of Tomato Fusarium Wilt by a Novel Genotype of 2,4-Diacetylphloroglucinol-producing *Pseudomonas* sp. NJ134," Plant Pathol. J. 28(1) : 93-100 (2012).
Palacio-Rodríguez, R. et al., "Halophilic rhizobacteria from *Distichlis spicata* promote growth and improve salt tolerance in heterologous plant hosts," Symbiosis, 2017, 11 pages.
Adiyaman, T. et al., "Selection of Biocontrol Agents of Pink Rot Based on Efficacy and Growth Kinetics Index Rankings," Plant Disease, vol. 95, No. 1, Jan. 2011, pp. 24-30.
Delorme, S. et al., "*Pseudomonas lini* sp. nov., a novel species from bulk and rhizospheric soils," International Journal of Systematic and Evolutionary Microbiology (2002), 52, 513-523.
Gómez-Lama Cabanás, C. et al., "Indigenous Pseudomonas spp. Strains from the Olive (*Olea europaea* L.) Rhizosphere as Effective Biocontrol Agents against *Verticillium dahliae*: From the Host Roots to the Bacterial Genomes," Frontiers in Microbiology, Feb. 2018, vol. 9, Article 277, 19 pages.
Sandhya, V. et al., "Endophytes from Maize with Plant Growth Promotion and Biocontrol Activity under Drought Stress," Russian Agricultural Sciences, vol. 43, No. 1, 2017, pp. 22-34.

* cited by examiner

*Primary Examiner* — Alton N Pryor
(74) *Attorney, Agent, or Firm* — HSML P.C.

(57) ABSTRACT

The invention relates to a biofungicide based on the bacterium *Pseudomonas lini* strain S57, RGM 2930 CChRGM (Chilean Collection of Microbial Genetic Resources) for agricultural use, especially in saline-boric environments. The biofungicide can be developed as solid and liquid formulations. Where the strain S57, has fungicidal properties against the phytopathogenic *fungi Botrytis cinerea, Fusarium oxysporum, Monilinia fructicola, Alternaria* sp., *Geotrichum candidum*, and *Macrophomina phaseolina*, both in the presence and absence of saline-bone conditions.

11 Claims, No Drawings

BIOFUNGICIDE BASED ON THE BACTERIUM *PSEUDOMONAS LINI* STRAIN S57 AND METHOD OF USE FOR THE CONTROL OF PHYTOPATHOGENIC FUNGI

TECHNICAL FIELD

The invention points to a biofungicide, controller of phytopathogenic *fungi* comprising the bacterium *Pseudomonas lini* strain S57 RGM 2930 CChRGM (the Chilean Collection of Microbial Genetic Resources), which is resistant to environments of high saline and boron concentration.

BACKGROUND OF THE INVENTION

Biofungicides correspond to microorganisms and/or their biological derivatives with antagonistic activity in phytopathogenic *fungi*, which have the ability to protect crops against attacks by phytopathogenic *fungi* either by antibiosis, parasitism, competition or by a direct fungicidal effect.

In the state of the art there are many biofungicidal microorganisms for different phytopathogenic *fungi*, however, in general their biofungicidal capacity is limited to environments whose conditions are similar to those in which the microorganism was originally isolated, and the activity is optimal, in crops that are kept under similar environmental parameters. For this reason, commercial formulations of biofungicides that are currently available show erratic results when used in crops maintained in environments of high saline-boric concentration (for example, crops maintained in desert climates, such as the Arica and Parinacota Region, Chile).

In addition, this phenomenon becomes more important when considering the increase in the processes of salinización of agricultural soils by natural and anthropogenic phenomena and the growing phenomenon of desertification. All of the above reveals the need to develop active and functional biofungicides for saline-boric environments, since currently, this specificity does not exist in the market.

To solve this technical problem, the inventors developed a biofungicide based on the bacterium *Pseudomonas lini* strain S57, which was isolated from inside a plant grown in boric saline soil, specifically from a plant in Socoroma, Arica and Parinacota Region, Chile. Surprisingly, this strain has been shown to have biofungicidal properties against phytopathogenic *fungi* that normally attack crops both in the presence and absence of saline-boric conditions.

The inventors studied numerous microorganisms before finding the strain of invention, including some of the same bacterial genus, but only the bacterium *Pseudomonas lini* strain S57 was able to control phytopathogenic *fungi* under the conditions of saline-boric stress evaluated.

In the state of the art there are documents where other strains of the species of the strain of the invention are disclosed, however, none of them aims to control phytopathogenic *fungi* in saline-boric soils, as the strain of the invention does. For example, the publication WO2012040343 (A2) discloses the use of a strain of *Pseudomonas lini* as an antagonist of the fungus that causes pink rot in potatoes (*Phytophthora erythroseptica*), The document does not describe its use to increase the defense of the plant against conditions of saline stress or the presence of boron compounds, so the strain of the invention differs from this document.

The invention relates to a biofungicide based on the bacterium *Pseudomonas lini* strain S57 for agricultural use, especially in saline-boric environments. The product can be developed as a solid and/or liquid formulation of the *Pseudomonas lini* strain (RGM 2930 CChRGM) and an appropriate support medium for agriculture. Where the bacterium *Pseudomonas lini* strain S57, has biocontrol properties against phytopathogenic *fungi* of the genera *Botrytis, Fusarium, Monilinia, Alternaria, Geotrichum,* and *Macrophomina*, for example. And especially against phytopathogenic *fungi* of the following species such as *Botrytis cinerea, Fusarium oxysporum, fructicola, Alternaria* sp., *Geotrichum candidum,* and *Macrophomina phaseolina* both in the presence and absence of saline-boric conditions The biofungicide of the invention corresponds to formulations (liquid and/or solid) based on the bacterium *Pseudomonas lini* strain S57 which, as we have already indicated, was isolated from the root of plants traditionally grown in Socoroma (a pre-Andean village in the Region of Arica and Parinacota, Chile).

The bacterium can be grown under laboratory conditions in both flasks and bioreactors, in suitable culture media. The microorganism produced in either of these two systems allows a liquid formulation to be obtained directly, which can be applied directly on the cultures.

For agricultural applications, it may also be desirable to apply a solid formulation, either as a powder or dispersible granules, for which it is necessary to mix the dehydrated bacteria with a support medium containing adjuvants, such as carriers, surfactants, stabilizers, dispersants or others, all agronomically appropriate. The liquid culture obtained in the flask or bioreactor culture can be dehydrated, for example, in a spray dryer for the generation of a solid, powder formulation, which can conveniently be combined with carriers chosen from kaolinite, diatomite, bentonite, maltodextrin or starch, for example; and in an embodiment with a surfactant and stabilizing agent such as carboxymethylcellulose, for example, the formulation can be obtained using any agriculturally appropriate carrier and/or surfactant available in the technique.

The inventors have shown that the bacterium *Pseudomonas* tin' strain S57 has the ability, in vitro, to biocontrol the fungi *Botrytis cinerea, Fusarium oxysporum, Monilinia fructicola, Alternaria* sp., *Geotrichum candidum,* and *Macrophomina phaseolina*, both in the presence and absence of saline-boric conditions.

As indicated, the biofungicide of the invention se can be developed into liquid and solid formulations. In the latter case as wettable powders with the described carriers, which are non-toxic and even with food or cosmetic quality and compatible with the agricultural industry. In addition, the production process does not use toxic reagents.

The bacterium *Pseudomonas lini* strain S57 is able to grow in saline-boric environments and retains its biocontrol properties of phytopathogenic *fungi* both in the presence of sodium and boron and in the absence of these.

The production process of the biofungicide of the invention is relatively simple, technologically viable and economically attractive. The supplies required in the production of the solid formulation are accessible and inexpensive.

The solid formulation option (bacterial suspension in solid carriers) allows for keeping the microorganism viable for a sufficient period of time to allow a transport and marketing process superior to liquid formulations.

Thus the invention points to a biofungicide with tolerance to saline-boric environments, which comprises the bacterium *Pseudomonas lini* strain S57 (RGM 2930 CChRGM).

In one embodiment, the invention points to a biofungicide with salt, boron and fungicide tolerant properties comprising the S57 strain of *Pseudomonas lini* and a support medium suitable for agriculture; one that is chosen between water, aqueous solutions, thick suspensions, granules and dust. In a preferred embodiment, the support is granule or powder and the carrier is chosen between kaolinite, diatomite, bentonite carboxymethylcellulose, starch and/or maltodextrin.

Conveniently, the biofungicide comprises a suspension of *Pseudomonas lini* (strain S57 (RGM 2930 CChRGM) at a concentration between $1\times10^4$ and $1\times10^{27}$ colony-forming units per mL, (CFU/mL), especially between $1\times10^6$ and $1\times10^{15}$ CFU/mL, and more especially between $1\times10^8$ and $1\times10^{12}$ CFU/mL or by CFU/g in the case of solids. In one embodiment this suspension is dehydrated before application and mixed with solid carriers and optionally adjuvant agents.

In an optional embodiment, the suspension dehydrated or not, is mixed with other selected fertilizer additives, nematicide, surfactants, UV protection systems and mixtures thereof.

Surfactant adjuvant agents suitable for the biofungicide are chosen between carboxymethylcellulose, non-ionic detergents (such as Tween 20, Tween 80, Triton X-100), oils of vegetable origin, sodium alginate, polyethylene glycol (300-8000), among, others.

In a second aspect, the invention points to a method to prevent or control fungal infection in crops, including contacting crops, seeds, plantlets, seedlings, plants or irrigation water, with the biofungicide of the invention. Where the crop, seed, plantlet, seedling or plant corresponds to vegetables, fodder plants or ornamental plants such as flowers. Especially the seed, plantlet, seedling or plant is chosen from one of the following agronomic species: chili, cotton, rice, pea, eggplant, beetroot, sweet potato, barley, onion, rapeseed/canola, strawberry, sunflower, corn, peanuts, apple, lettuce, potato, cucumber, paprika, beans, soybeans, sorghum, tomato, wheat, carrot, *Alstroemeria*, carnation, gerbera, *gladiolus, gypsophila*. Where conveniently crops seeds, plantlets, seedlings or plants are found in saline-boric environments.

And where the infestation by *fungi* in crops, seeds, plantlets or seedlings, or plants is mediated by *fungi* of the genera *Botrytis, Fusarium, Monilinia, Alternaria, Geotrichum*, and *Macrophomina*, for example. And especially the *fungi* to be controlled belong to the following species such as *Botrytis Cinerea, Fusarium oxysporum, Monilinia fructicola, Alternaria* sp. *Geotrichum candidum Macrophomina phaseolina.*

The following describes a preferred way of realizing the proposed invention, without limiting the technical variants that an expert in the field can incorporate or modify, and that fall within the scope of the inventive concept that we claim in this application.

EXAMPLES

1. Obtaining *Pseudomonas lini*

The bacterium was isolated from samples of Oregano root from Socoroma (S18° 15' 47.8", W69° 35' 46.3"; height 2.892 as). The plants were grown with triple phosphate, and lamb and poultry manure.

The samples were collected aseptically using a metal shovel disinfected with 70% ethanol, and stored in sterile plastic bags. The samples were kept at 4° C. in a refrigerator and immediately transported to the laboratory for processing.

The bacteria were obtained by cutting the root into small parts, which were disinfected using 95% ethanol (v/v) for 2 minutes, 2% sodium hypochlorite (v/v) for 2 minutes, and 70% ethanol (v/v) for 2 minutes, followed by two washes with sterile distilled water for 2 minutes each time. The disinfected portions were placed on King's B media plates containing (per liter): 20 g of peptone. 10 ml of glycerol, 1.5 g of $K_2HPO_4$, 1.5 g of $MgSO_4\times7H_2O$ and 15 g of agar (pH 7.0). The plates were incubated at room temperature for 1 week or until microbial growth was observed. The bacteria from enriched cultures were isolated by serial dilution in King's B liquid medium and sown in plates of the same medium supplemented with 15 g/L agar-agar. Incubations were performed at room temperature. The isolated colonies were transferred to liquid medium. These procedures were repeated until a single, homogeneous morphology was observed.

Once isolated, it was identified. The genomic DNA of the bacterium was obtained using the RNeasy Ultraclean Microbial (QIAGEN) kit according to the procedure described by the manufacturer. The 16S rRNA gene was amplified by PCR using the bacteria-specific primers 27F and 1492R. The results of the sequencing indicated that the isolated strain corresponds to *Pseudomonas lini*, the internal identification number S57 was assigned and was deposited in the Chilean Collection of Microbial Genetic Resources (CChRGM) under the access number RGM 2930 on Feb. 5, 2020, in accordance with the Budapest Treaty.

2. Biofungicidal Activity In Vitro

The inhibition of the growth, in vitro, of phytopathogenic *fungi* was studied: for this purpose, a dual culture assay was carried out in plates of potato dextrose agar (PDA), which were inoculated with a phytopathogenic fungus (independently with *Botrytis cinerea, Geotrichum candidum, fructicola, Fusarium oxysporum*, Macrophominia *phaseolina* and *Alternaria* sp. in the center of each plate and aliquots of 15 µl of the biofungicide of the invention (1×10 UCF/mL) surrounding the fungus according to the method described by Salvaterra-Martinez et al. (2015). As controls, PDA plates inoculated only with the fungus in the center were used Inhibition of the radial growth of miceli or (ICRM) of the fungus was calculated using the equation: ICRM=[(C−T)/C]×100; where C is the area of fungal growth on the control plate, and T is the area of fungal growth with treatment. The bacterium *Pseudomonas lini* strain S57 showed antifungal activity against all *fungi* tested. These results demonstrate the capacity of the strain of the invention as a bio controller of phytopathogenic *fungi*, or biofungicide.

TABLE 1

Inhibition, in vitro, of the growth of six phytopathogenic fungi by the bacterium *Pseudomonas lini* strain S57.

| Phytopathogenic fungus | ICRM (%) |
|---|---|
| *Botrytis cinerea* | 48.3 |
| *Fusarium oxysporum* | 23.5 |
| *Geotrichum candidum* | 58.6 |
| *Monilinia fructicola* | 67.2 |
| *Macrophomonia phaseolina* | 64.6 |
| *Alternaria* sp. | 38.1 |

3. Tolerance, In Vitro, Under Saline-Boric Conditions

Tolerance to NaCl and $H_3BO_3$: whether the candidate bacterium was able to grow in the presence of different concentrations of NaCl (8 g/L, 15 g/L and 20 g/L) or $H_3BO_3$ (10 ppm, 50 ppm and 100 ppm) was determined. In addition, the tolerance of the bacterium to increasing concentrations of NaCl and $H_3BO_3$ was determined (emulating the concentrations of Lluta irrigation water: 20 ppm boron and 14.64 mmol/L sodium). Whether or not bacterial growth was observed at the different concentrations tested was recorded.

The inhibition of the growth, in vitro, of *fungi* in the presence of NaCl and $H_3BO_3$ was studied: a dual culture test was carried out in PDA plates, which were inoculated with a phytopathogenic fungus (*Botrytis cinerea. Geotrichum candidum, Monilinia fructicola* or *Fusarium oxysporum*) the center of each plate and aliquots of 15 µl of the candidate ($1\times10^8$ UCF/mL) surrounding the fungus. The culture medium PDA is amended with 10 g/L NaCl and 110 ppm $H_3BO_3$. The ICRM was calculated and the results were compared with unamended culture medium.

The bacterium *Pseudomonas* strain S57 was able to grow in all the conditions tested, showing abundant growth (+++) similar to growth wider standard conditions (S.C.), in the presence of 8 g/L of NaCl. 10 and 50 ppm $H_3BO_3$, and in saline-boric conditions similar to the irrigation water of the Lluta River.

The growth of bacterium *Pseudomonas lini* strain S57 in the presence of 20 g/L of NaCl was much slower, being able to reach a turbidity similar to that of S.C. in better times. This same effect was observed when the saline-boric concentrations of the Lluta River were emulated 9 times, noting inhibition of bacterial growth at higher concentrations. The results are shown in Table 2.

It is possible to indicate that the bacterium *Pseudomonas lini* strain S57 is able to grow and tolerate saline-boric conditions, similar to those measured in the coastal valleys of the Arica and Parinacota Region, where the Lluta valley is the site of the most extreme saline-boric conditions, which reach 20 ppm boron and 14.64 mmol/t, of sodium, which is equivalent to 0.114 g/L of boric acid and 0.86 g/L of NaCl.

As can be seen in the results, the bacterium of the invention supports even the water of Lluta concentrated 9 times and brine (8 to 20 g/L NaCl). It is interesting to note that seawater has an average salinity of 3.5 g/L of NaCl, and the strain of the invention survives in almost 6 times greater conditions and shows optimal growth at 8 g/L to more than twice the salinity of seawater.

TABLE 2

Growth of the bacterium *Pseudomonas lini* strain S57 in the presence of NaCl or $H_3BO_3$.

| Condition | Growth |
| --- | --- |
| S.C. | +++ |
| 8 g/L NaCl | +++ |
| 15 g/L NaCl | ++ |
| 20 g/L NaCl | + |
| 10 ppm $H_3BO_3$ | +++ |
| 50 ppm $H_3BO_3$ | +++ |
| 100 ppm $H_3BO_3$ | ++ |
| Lluta irrigation water | +++ |
| 9X Lluta Irrigation Water | + |

4. Biofungicidal Activity in the Presence and Absence of Saline-Boric Conditions.

The inhibition of the growth, in vitro, of phytopathogenic *fungi* under standard and saline-boric conditions was studied: for this purpose, a dual culture test was carried out on plates of potato dextrose agar (PDA), which were inoculated with a phytopathogenic fungus (independently with *Botrytis cinerea, Geotrichum candidum, Monilinia fructicola, Fusarium oxysporum*) in the center of each plate and aliquots of 15 µl of the biofungicide of the invention ($1\times10^8$ UCF/mL) as in Example 2, both under standard conditions (absence of NaCl and $H_3BO_3$) and in saline-boric conditions (similar to irrigation water from the Lluta Valley), and the ICRM was determined for each condition, based on 3 repetitions. The results are shown in Table 3.

The bacterium *Pseudomonas lini* strain S57 showed antifungal activity against the *fungi* tested, both in standard conditions and in saline-boric conditions. It is possible to observe that the antifungal activity is maintained in the presence of sodium and boron for both *Botrytis cinerea* and *Fusarium oxysporum*, both *fungi* being an important phytosanitary problem in the Region of Arica and Parinacota and in other localities where intensive horticulture is practiced. However, this effect is minor against *Geotrichum candidum* and *Monilinia fructicola* under saline-boric conditions. These results demonstrate the potential as a biofungicide of phytopathogenic *fungi* for environments where sodium and boron concentrations limit the use of commercial biofungicides.

TABLE 3

Inhibition, in vitro, of the growth of four phytopathogenic fungi by the bacterium *Pseudomonas lini* strain S57.

| | ICRM (%) | |
| --- | --- | --- |
| Phytopathogenic fungus | Standard conditions | Saline-Boric Conditions |
| *Botrytis cinerea* | 48.3 | 42.8 |
| *Fusarium oxysporum* | 23.5 | 26.3 |
| *Geotrichum candidum* | 58.6 | 29.6 |
| *Monilinia fructicola* | 67.2 | 52.3 |

5. Activity, In Vitro, Anti-*Botrytis* and Anti-*Fusarium* in Different Culture Media For this purpose, a culture test was carried out on plates of solid medium of PDA or King B medium, which were inoculated with the bacterium *Pseudomonas lini cepa* S57 in the form of a grass and with the phytopathogenic fungus (*Botrytis cinerea* or *Fusarium oxysporum*) in the center of each plate. As a control, respective solid medium plates inoculated only with the fungus in the center were used. The ICRM of the fungus was calculated, as described above. The results are shown in Table 5.

It is observed that the anti-*Botrytis* activity is complete in the grass of bacterium *Pseudomonas lini* strain S57 in both media, and the anti-*Fusarium* activity greater in King B medium, with respect to the PDA medium.

TABLE 4

In vitro, anti-Botrytis and anti-Fusarium activity of the bacterium *P. lini* strain S57.

| | ICRM (%) | |
| --- | --- | --- |
| Culture medium | *Botrytis cinerea* | *Fusarium oxysporum* |
| PDA | 100.0 | 44.0 |
| King's B | 100.0 | 69.0 |

These examples should be considered as illustrative and not limiting to the present invention, which is fully defined in the accompanying claims.

The invention claimed is:

1. A biofungicide tolerant to saline-boric conditions, comprising a S57 strain of *Pseudomonas lini* RGM 2930 CChRGM and an appropriate a support medium for agriculture.

2. The biofungicide according to claim 1, further comprising a support medium selected from the group consisting of water, aqueous solutions, thick suspensions, granules, and powders.

3. The biofungicide according to claim 2, wherein the support medium is granule granules or powder powders and comprises a carrier that is selected from the group consisting of kaolinite, diatomite, bentonite, carboxymethylcellulose, starch, maltodextrin, and mixtures thereof.

4. The biofungicide according to claim 2, comprising a suspension of *Pseudomonas lini* strain S57 RGM 2930 CChRGM in a concentration between $1 \times 10^4$ and $1 \times 10^{27}$ CFU/mL in liquids or, or by CFU/g in the case of solids.

5. The biofungicide according to claim 4, further comprising additives selected from the group consisting of fertilizer, nematicide, surfactants, UV protection systems, and mixtures thereof.

6. A method to prevent or control infestation by phytopathogenic fungi, comprising contacting crops, seeds, plantlets, seedlings, plants, or irrigation water with the biofungicide of claim 1.

7. The method according to claim 6, wherein the crops, seeds plantlet plantlets or seedling seedlings, or plants are obtained from plants selected from the group consisting of vegetables, fodder plants, or ornamental plants.

8. The method according to claim 7, wherein the plantlet plantlets or seedling seedlings or plant crop crops are obtained from agronomic species selected from the group consisting of chili, cotton, rice, pea, eggplant, beetroot, sweet potato, barley, onion, rapeseed/canola, strawberry, sunflower, corn, peanut, apple, lettuce, potato, cucumber, peppers, beans, soybeans, sorghum, tomato, wheat, carrot, alstroemeria, carnation, *gerbera, gladiolus*, and *gypsophila*.

9. The method of claim 8, wherein the infestation by the phytopathogenic fungi in the crops, seeds, plantlets or seedlings, or plants is mediated by fungus of at least one genera selected from the group consisting of *Botrytis, Fusarium, Monilinia, Alternaria, Geotrichum*, and *Macrophomina*.

10. The method of claim 9, wherein the infestation by the fungi in the crops, seeds, plantlets or seedlings, or plants is mediated by the fungi of at least one species selected from the group consisting of *Botrytis cinerea, Fusarium oxysporum, Monilinia fructicola, Alternaria* sp., *Geotrichum candidum*, and *Macrophomina phaseolina*.

11. The method of claim 6, wherein crops, seeds, plantlets, seedlings, plants, or irrigation water are found in saline-boric environments.

* * * * *